Figure 2:
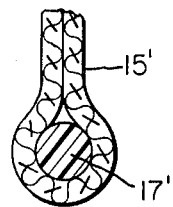

United States Patent [19]

Hixenbaugh

[11] 4,056,374
[45] Nov. 1, 1977

[54] TUBULAR GAS FILTER

[75] Inventor: Dennis L. Hixenbaugh, Louisville, Ky.

[73] Assignee: American Air Filter Company, Inc., Louisville, Ky.

[21] Appl. No.: 659,290

[22] Filed: Feb. 19, 1976

[51] Int. Cl.² ............................................. B01D 46/02
[52] U.S. Cl. ..................................... 55/377; 55/378; 55/381; 55/524; 55/528; 428/422
[58] Field of Search ................. 55/381, 382, 376–378, 55/374, 341 NT, 524, 528, DIG. 16; 428/422, 392, 212, 36, 228, 257

[56] References Cited

U.S. PATENT DOCUMENTS

| 480,834 | 8/1892 | Sheedy | 55/381 |
|---|---|---|---|
| 1,815,242 | 7/1931 | Davidson | 55/381 |
| 1,843,639 | 2/1932 | Hansen | 55/381 X |
| 2,338,504 | 1/1944 | Foster | 55/378 X |
| 2,576,310 | 11/1951 | Ruemelin | 55/377 |
| 2,674,340 | 4/1954 | Vance | 55/382 X |
| 2,952,332 | 9/1960 | Metro | 55/341 NT X |
| 3,204,392 | 9/1965 | Schwab | 55/381 |
| 3,429,107 | 2/1969 | Graves | 55/381 X |
| 3,483,019 | 12/1969 | Youse | 428/392 X |
| 3,498,826 | 3/1970 | Caroselli et al. | 428/392 X |
| 3,790,403 | 2/1974 | Ribbans | 428/422 X |
| 3,838,082 | 9/1974 | Sauer | 428/422 X |
| 3,928,703 | 12/1975 | Cook | 428/422 X |

FOREIGN PATENT DOCUMENTS 867,576  5/1961  United Kingdom ................. 55/381

OTHER PUBLICATIONS

The Condensed Chemical Dictionary, 8th ed., N.Y., Van Nostrand Reinhold Co., 1971., pp. 712, 713, 849.
Fundamentals of Fabric Collectors & Glossary of Terms Publication No. F-2, Industrial Gas Cleaning Institute, Inc., Rye, N.Y., 1969, pp. 3–6.
Filters of Teflon Fiber, Bulletin A-83274, E. I. Du Pont de Nemours & Co., Wilmington, Delaware.

Primary Examiner—Frank W. Lutter
Assistant Examiner—Kathleen J. Prunner

[57] ABSTRACT

An improved tubular filter bag of two piece construction, one piece being coated with a flexible and abrasive resistant coating, the coated piece being in communication with a flow-through inlet for absorbing the impact of the bag during cleaning. Also disposed at approximately the maximum impact point of the filter bag is a support member to restrict flexing of the bag during cleaning.

9 Claims, 2 Drawing Figures

U.S. Patent  Nov. 1, 1977  4,056,374

TUBULAR GAS FILTER

BACKGROUND OF THE INVENTION

The present invention relates to a gas separating tubular filter bag and more particularly relates to a tubular filter bag having improved flexing and abrasive resistant properties at its maximum impact position.

In the removal of particulates from suspension in a gas stream, one means for removal is to arrange a plurality of porous bags having an open bottom end and a closed upper end in an upright position in a housing whereby dirty gases pass through open ends of the bags, the particulate materials being collected on the inner walls thereof. The bags are generally made from many different types of material, the specific material utilized being determined by the operating characteristics or conditions of the gas stream in which the bag will be utilized. As the particulates build up on the bag walls it is necessary, from time to time, to dislodge these particulates therefrom. This is usually accomplished by shaking the bags or reversing the flow of air through the bags wherin the pressure of the air dislodges the particles from the bag walls.

In the filtering operation employing such bags, it has been found that during the period when the cleaning gas flows through the bags, the bags collapse then re-inflate. These cleanings, usually being rather frequent, cause the bags to fail at the connection between the bag and the connecting devices for the bag due to continued abraiding between the bag and the connectors.

SUMMARY OF THE INVENTION

In the present invention, it is recognized that it is desirable to provide a tubular filter bag having improved flexing and abrasive resistant properties at the connection between the tubular bag and its connecting means with a fluid flow inlet. Furthermore, it is recognized that it is desirable to provide a tubular filter bag having a wear resistant coating at the portion thereof which is susceptible to receiving the maximum impact of a gas stream thereby adding additional life to a tubular filter bag.

The present invention advantageously provides a straightforward arrangement for a tubular filter bag having improved wear resistant qualities. The present invention further provides a tubular filter bag which is relatively inexpensive, sturdy, and is adaptable for connection to an apertured plate member.

Various other features of the present invention will become obvious to those skilled in the art upon reading the disclosure set forth hereinafter.

More particularly, the present invention provides a filter bag for removing particulates from a dirty gas stream comprising: a first tubular flexible gas pervious member having at least one opening in one end thereof, and an opposed end having means for attaching to a bag support means; a second tubular flexible gas pervious member having a cross-sectional area substantially the same as the first tubular member and having openings in each end thereof, the second tubular member having a flexible and abrasive resistant coating thereon, one opening being in axial alignment with and attached to the opening of the first tubular member, and, the other opening including means for attaching to a flow inlet means; and, motion restricting means disposed adjacent to the connection between the first tubular member and the second tubular member.

It is to be understood that various changes can be made in the arrangement, form and construction of the apparatus disclosed herein without departing from the scope and spirit of the present invention.

Figure 1:
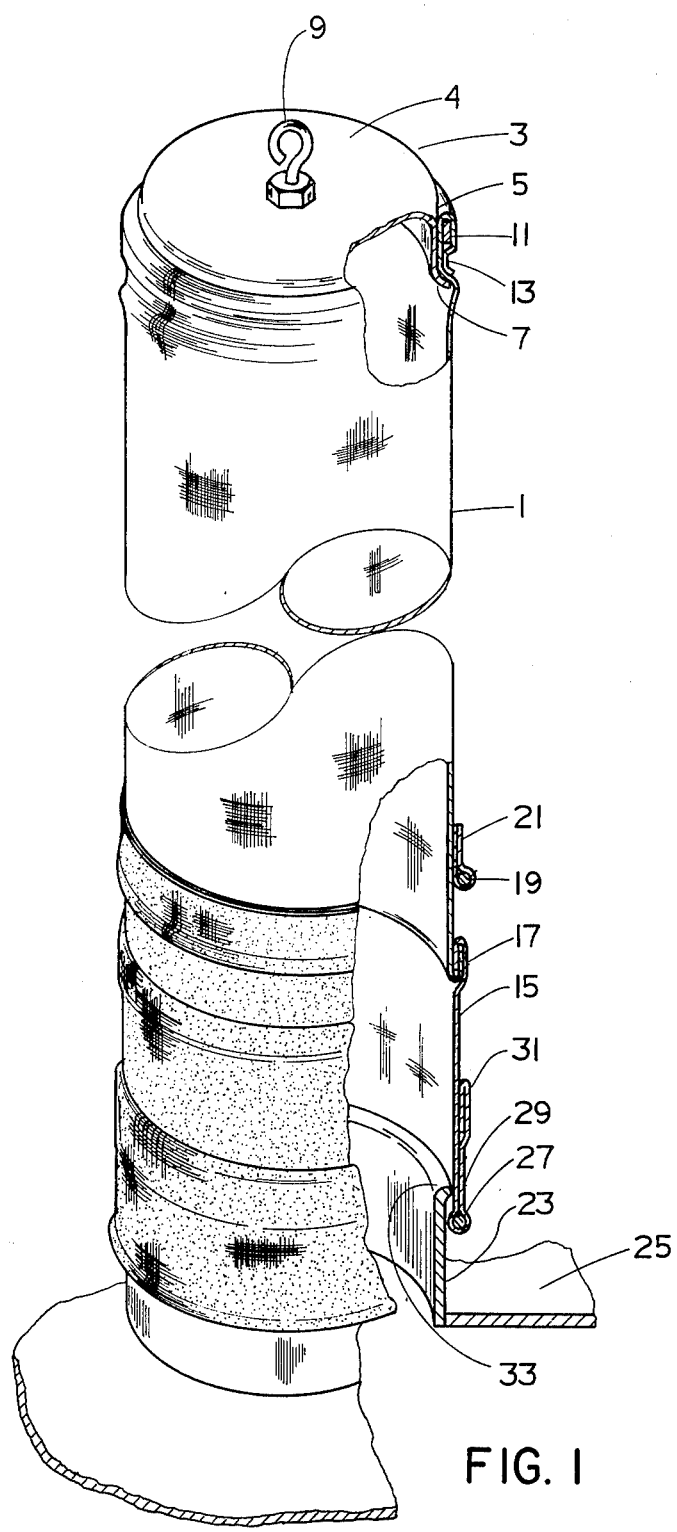

FIG. 1 is a perspective view, with selected portions cut-away, of a preferred tubular filter bag of the present invention; and, FIG. 2 is a cross-sectional view of a preferred motion restricting ring member which may be utilized in a preferred tubular filter bag of the present invention.

In FIG. 1, a first tubular member 1 of fiberglas or fiberglas coated with graphite or other similar materials having openings in each end thereof is closed at its upper end by a closure member 3, closure member 3 being provided with an impervious wall portion 4 having a downwardly extending side 5 circumferentially surrounding the wall 4. The side 5 at its lower extremity includes an outwardly extending lip 7 for receiving the open end of the tubular member 1 thereon. Closure member 3 includes a hook 9 on the wall 4 for attaching to means (not shown) such as a chain or other support means for supporting the filter tube in an upright position in a filter housing (not shown).

The first tubular member 1 includes a ring 11 which is generally a snap band or other material having elastomeric properties which enables the tubular member to be slipped over the outwardly extending lip 7 of the cap 3. The ring 11 is generally about the same diameter as the tubular member 1 wherein the tubular member 1 at its upper end is folded over the ring 11 and sewn in place, generally around the entire periphery of the tubular member 1, the sewn position being designated by the number 13.

The opposed open end of the tubular member 1 is in axially aligned flow communication with a first opening in a second tubular member 15 and attached at the position noted by the numeral 17. Generally, the means for attaching the tubular member 1 and the tubular member 15 is by slipping the end of the tubular member 1 within the end of the tubular member 15 and stitching around the outer periphery of the tubular member 15 at the position designated by the aforementioned numeral 17. The tubular member 15 is usually fiberglas coated with a polytetrafluoroethylene, such as Teflon or other suitable flexible resisting materials which increases the resistance of the tubular material to abrasion. Furthermore, the tubular member 15, generally being fiberglas, which is the same material as tubular member 1, is generally of heavier, more dense, more rigid, less permeable, and a different weave in comparison with the tubular member 1. Tubular member 15 is generally of a weave utilized to receive a coating thereon and is not specifically constructed for filtering. As for tubular member 1, the material used therein is specifically woven for use in a filtering operation.

Adjacent to the opening in the tubular member 1 and spaced upwardly therefrom is a motion restricting means which is attached around the outer periphery of the tubular member 1. The motion restricting means, as shown in FIG. 1, is a metallic ring member 19 which extends around the outer periphery of the tubular member 1. Ring 19 is enclosed in a flexible material 21 which is folded around the ring member 19 and sewn to the tubular member 1 around the outer periphery thereof. It is realized that the ring member 19, which may be metal or plastic, the plastic ring member 17' enclosed in a flexible material 15' as shown in FIG. 2 may be any other material which will prevent the bag from collapsing at the preselected position during the shaking or cleaning of the tubular filter bag. The material 21 is generally the same material as the tubular member 1 which is usually fiberglas or fiberglas coated with graphite or other similar materials. Also, porous fabric type materials other than fiberglas may be used, depending upon the environment within which the bag will be used.

The second opening in the tubular member 15 is in communication with and fits over the outwardly extending flange portion 23 of the apertured plate member 25.

The lower end of the tubular member 15 which fits over flange portion 23 includes a ring 27 which extends around the outer periphery of the tubular member 15 wherein the end of tubular member 15 is looped over the ring 27 and the ring 27 is held in place by stitching around the periphery at the position designated by the numeral 29. For extra support of the end, stitching is also provided along the outer periphery at the position noted by the numeral 31.

The ring 27 is generally metallic, but may be plastic or any other member which exhibits elastomeric properties so that the tubular filter member 15 can be slipped over the flange portion 23. Flange portion 23 may also be provided with an outwardly extending lip portion 33 which holds the tubular filter onto the flange portion 23.

In operation, the flexible resistant coating on the second tubular member 15 provides abrasive resistance to the particulate materials which are kept in an agitating motion at the inlet of the filter by the rapid flow of gases entering the tubular filter as well as the abrasion during cleaning, the inlet being defined by flange portion 23. During cleaning, the filter bag is collapsed which causes abrading between the bag and the outwardly extending flange portion 23 of the apertured plate member 25. However, this abrading is reduced by reducing the collapsing at the preselected position of the ring 19 as discussed previously. Furthermore, it has been found that not only should the flexible resistant coating be abrasive resistant but the coating should also be one that improves the stiffening or support of the tubular material. It has been found that polytetrafluoroethylene coated to a fiberglas tubular member exhibits these qualities, adding additional wear resistant to the maximum impact position of the gas stream as well as prevents unnecessary flexing of the tubular filter thereby decreasing the abrading of the bag against the flange portion 23.

It will be realized that various change may be made to the specific embodiment shown and described without departing from the scope and spirit of the present invention

What is claimed is:

1. A filter bag for removing particles from a dirty gas stream comprising: a first tubular flexible gas filter member having at least one opening in one end thereof, and an opposed end having means for attaching to a bag support means; a second tubular flexible dust impervious fabric member having a cross-sectional area substantially the same as said first tubular member and having an opening in each end thereof, said second tubular member having a flexible and abrasive resistant coating thereon, one end being connected to said one end of said first tubular member, and, the other end including means for attaching to a flow inlet means; and, one motion restricting ring member attached to one of said tubular members remote from said flow inlet means disposed adjacent to the connection between said first tubular member and said second tubular member maintaining said connection in a substantially non-flexing position.

2. The filter bag of claim 1 wherein said motion restricting ring member extends around the outer periphery of said first tubular member adjacent said opening in said one end.

3. The filter bag of claim 2 wherein said ring member is a metallic member.

4. The filter bag of claim 2 wherein said ring member is a plastic member.

5. The filter bag of claim 1 wherein said first tubular member is sewn to said second tubular member.

6. The filter bag of claim 1 wherein said first tubular member is fiberglas and said second tubular member is fiberglas coated with polytetrafluoroethylene, said fiberglas of said first tubular member being of one weave and said fiberglas of said second tubular member being of another weave.

7. The filter bag of claim 1 wherein said flow inlet means is a plate member having an aperture therein with an outwardly extending flange portion, said flange portion having an outer diameter substantially the same as the inner diameter of said second tubular member to receive said second tubular member thereon.

8. The filter bag of claim 7, said flange member having an outwardly extending lip portion thereon, said one end of said second tubular member having a connecting ring member attached thereto, said connecting ring member nesting under said lip of said flange.

9. The filter bag of claim 8 wherein said ring member is a resilient flexible ring member.

* * * * *